United States Patent
Ray et al.

(10) Patent No.: US 8,510,322 B2
(45) Date of Patent: Aug. 13, 2013

(54) ENRICHED SEARCH FEATURES BASED IN PART ON DISCOVERING PEOPLE-CENTRIC SEARCH INTENT

(75) Inventors: Aninda Ray, Bellevue, WA (US); Dmitriy Meyerzon, Bellevue, WA (US); Uppinakuduru Raghavendra Udupa, Bangalore (IN)

(73) Assignee: Microsoft Corporation, Redmond, WA (US)

( * ) Notice: Subject to any disclaimer, the term of this patent is extended or adjusted under 35 U.S.C. 154(b) by 32 days.

(21) Appl. No.: 13/162,620

(22) Filed: Jun. 17, 2011

(65) Prior Publication Data

US 2012/0323877 A1    Dec. 20, 2012

(51) Int. Cl.
    *G06F 17/30*    (2006.01)
(52) U.S. Cl.
    USPC .......................................... 707/765; 707/698
(58) Field of Classification Search
    USPC .................... 707/999.003, 999.005, 999.107, 707/759, 765, 698
    See application file for complete search history.

(56) References Cited

U.S. PATENT DOCUMENTS

| | | | |
|---|---|---|---|
| 7,747,639 B2 | 6/2010 | Kasperski et al. | |
| 7,991,724 B2 * | 8/2011 | Antebi et al. | 706/45 |
| 8,190,626 B2 * | 5/2012 | Ball et al. | 707/765 |
| 2005/0084152 A1 * | 4/2005 | McPeake et al. | 382/173 |
| 2006/0004878 A1 * | 1/2006 | Lawrence et al. | 707/200 |
| 2006/0173961 A1 | 8/2006 | Turski et al. | |
| 2007/0033221 A1 * | 2/2007 | Copperman et al. | 707/103 R |
| 2007/0112720 A1 | 5/2007 | Cao et al. | |
| 2009/0228439 A1 | 9/2009 | Manolescu et al. | |
| 2009/0319521 A1 * | 12/2009 | Groeneveld et al. | 707/6 |
| 2010/0169331 A1 | 7/2010 | Karidi et al. | |
| 2010/0257162 A1 * | 10/2010 | Buron et al. | 707/723 |
| 2011/0282856 A1 * | 11/2011 | Ganti et al. | 707/706 |

OTHER PUBLICATIONS

Plattner, Hasso, "Enterprise Search", http://epic.hpi.uni-potsdam.de/pub/Home/TrendsAndConceptsI2007/07_-_Enterprise_Search.pdf, 2007, 48 pp.

Guo, Liang, "Social Network Document Ranking", http://mobisna.ist.psu.edu/gou_jcd12010.pdf, Jun. 21-25, 2010, pp. 313-322.

Gou, Liang et al., "SNDocRank: a Social Network-Based Video Search Ranking Framework", http://clgiles.ist.psu.edu/pubs/MIR2010-SNA-doc.pdf, Mar. 29-31, 2010, pp. 367-376.

Unknown, "Social Relevancy Rank: What's Missing?", http://www.readwriteweb.com/archives/rethinking_social_relevancy_rank_whats_missing.php# . Jul. 26, 2009, 4 pp.

(Continued)

*Primary Examiner* — Leslie Wong
(74) *Attorney, Agent, or Firm* — Merchant & Gould (57) ABSTRACT

A search environment of an embodiment includes name mining and matching features used in part to identify people-centric queries and provide an enriched search experience, but is not so limited. A method of an embodiment operates to provide an expanded query based in part on a geometric similarity measure, an edit distance measure, a string similarity measure, and a cumulative similarity measure. A search system of an embodiment includes a mined candidate generator component and a name matcher component used in part to identify name queries and provide an expanded query that includes original query terms and one or more valid mined names. Other embodiments are also disclosed.

18 Claims, 5 Drawing Sheets

(56) References Cited

OTHER PUBLICATIONS

Winkler, W. E., "The state of record linkage and current research problems. Statistics of Income Division", Internal Revenue Service Publication R99/04. Available from http://www.census.gov/srd/www/byname.html., 1999, 15 pp.

Jaro, Matthew A., "Advances in Record-Linkage Methodology as Applied to Matching the 1985 Census of Tampa, Florida", Journal of the American Statistical Association, Jun. 1989, vol. 84, No. 406, pp. 414-420.

Jaro, Matthew A., "Probabilistic Linkage of Large Public Health Data Files", Statistics in Medicine, vol. 14, 1995, pp. 491-498.

Udupa, Raghavendra et al., "Hashing-based Approaches to Spelling Correction of Personal Names", http://research.microsoft.com/apps/pubs/default.aspx?id=136315, Proceedings of EMNLP 2010, Oct. 2010, 10 pp.

\* cited by examiner

ENRICHED SEARCH FEATURES BASED IN PART ON DISCOVERING PEOPLE-CENTRIC SEARCH INTENT

BACKGROUND

Search engines enable users with a tool that can be used to locate relevant information such as documents, web sites, and other files using keyword inputs. A different search paradigm, sometimes referred to as a "people search," "person finder," or "people locator," has emerged as a different type of search service. A people searching paradigm is focused on people; whereas general web search and enterprise search tools typically encompass a wide range of topics including people, products, news, events, etc. Personal name inputs, including misspelled and omitted names, tend to be the predominant queries submitted in a people search domain which may employ large authoritative name directories having names in the tens of thousands or millions. Spelling errors in personal names are of a different nature as compared to those in general text. Thus, to ensure a desirable user experience and promote return of search service users, correcting misspelled personal names plays a noteworthy role in reducing the time and effort required by users to find people they are searching for.

Some search systems rely on a correct entry of a person's exact name when a user searches over a broad search space and are typically not configured to yield any profile information of a person who is the subject of a search. As an example, one search solution constraint may require a user to explicitly navigate to a "People" bar or site to search for a person's profile resulting solely in a ranked collection of profiles that contain the exact name terms, with no additional information provided. A user needs to perform additional steps, including executing subsequent queries, to extract any additional information beyond any profile information. For example, a user would need to perform additional searching operation to query and fetch any documents authored by a top ranked profile. Such limited search capabilities provide overly constrained search results and lack promotion of user confidence in the search system or service.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided that include the use of name mining and matching features in part to identify people-centric queries and provide an enriched search experience, but are not so limited. In an embodiment, a method operates to provide an expanded query based in part on a geometric similarity measure, an edit distance measure, a string similarity measure, and a cumulative similarity measure. A search system of an embodiment includes a mined candidate generator component and a name matcher component used in part to identify name queries and provide an expanded query that includes original query terms and one or more valid mined names. Other embodiments are also disclosed.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

As described below, embodiments encompass intelligent search features capable of determining whether any given search query is people-centric or person-centric, but are not so limited. A people-centric query can be described as a search query where an intent or focus of a particular query is to retrieve information associated with an individual or individuals. Embodiments can be used to process queries that are not an exact name of a person including discovering intent from misspelled and/or omitted queries without having to navigate to any particular people-search interface or application. As discussed below, an embodiment uses character bigrams rather that a phonetic representation in part to provide people-centric query features.

Embodiments provide people-centric query determination and expansion features that include providing and/or using an altered, expanded, and/or corrected query when a people-centric query is identified, but the embodiments are not so limited. For example, a search engine can use a people-centric query determination algorithm to provide transformed queries resulting in part from identification and/or correction of name spelling errors and/or other input errors. In an embodiment, components of a search service can use mined name candidates and a multi-level name constraint set to generate valid personal names that can be used as query expanders or transformers.

Various embodiments can also provide customizable actions if a people-centric query is identified to thereby enrich the user's search experience and promote further use of the people-centric search service. For example, a search experience can be enhanced by performing customizable actions when a people-centric query is identified to not only return a person's record associated with the people-centric search but also return top documents authored by the person, curriculum vitae information, social network contact information, v-card information, profile information from any number of social networks, and/or render the result differently or with additional identifying information (e.g., provide a photo of a searched for person), etc. A user can adjust how customized actions return information and when. Users can opt-out of having personal and other information from being returned or used by the people-centric search service.

In an embodiment, as part of discovering or identifying people-centric queries, if any given search query likely contains a name of a person, including misspelled and omitted names, a search service can operate to determine that the given query is a people-centric query and the intent of the query is to extract a person's record, profile, and/or other information associated with the person subject to the query.

For example, a search service can operate using a name mining and matching algorithm to identify valid names based in part on a misspelled or mistaken name query input. Accordingly, a query input need not be an exact or a correct name of a person and various embodiments can distinguish such inputs as name queries including correcting any misspellings and generating expanded or transformed queries using an original input and one or more valid name expanders, as described below. A search service of an embodiment operates in part to discover people-name or people-centric queries from universal search queries in an enterprise or other setting.

In an embodiment, a searching interface can use people-centric query determination features in part to identify a searcher's intent including focusing search input to name queries and providing altered, expanded, and/or transformed queries that include one or more personal names including corrected name inputs. The people-centric query determination features can be used to correct a misspelled query input and return the most likely name based on how close the original query is to a corrected name or names provided based in part on name mining and matching features. A searching interface of one embodiment operates in conjunction with a search server to mine personal names and provide potential candidates that can be validated and/or invalidated, wherein validated candidates can be used as query expanding terms or names. Expanded queries can be automatically executed and relevant results provided or suggested to the user as a query suggestion for affirmative input by a user. For example, a transformed name query can be presented to a user as a suggested refinement to an existing search and run only if the user clicked a link or otherwise affirmatively selects to use the name query suggestion.

Figure 1:
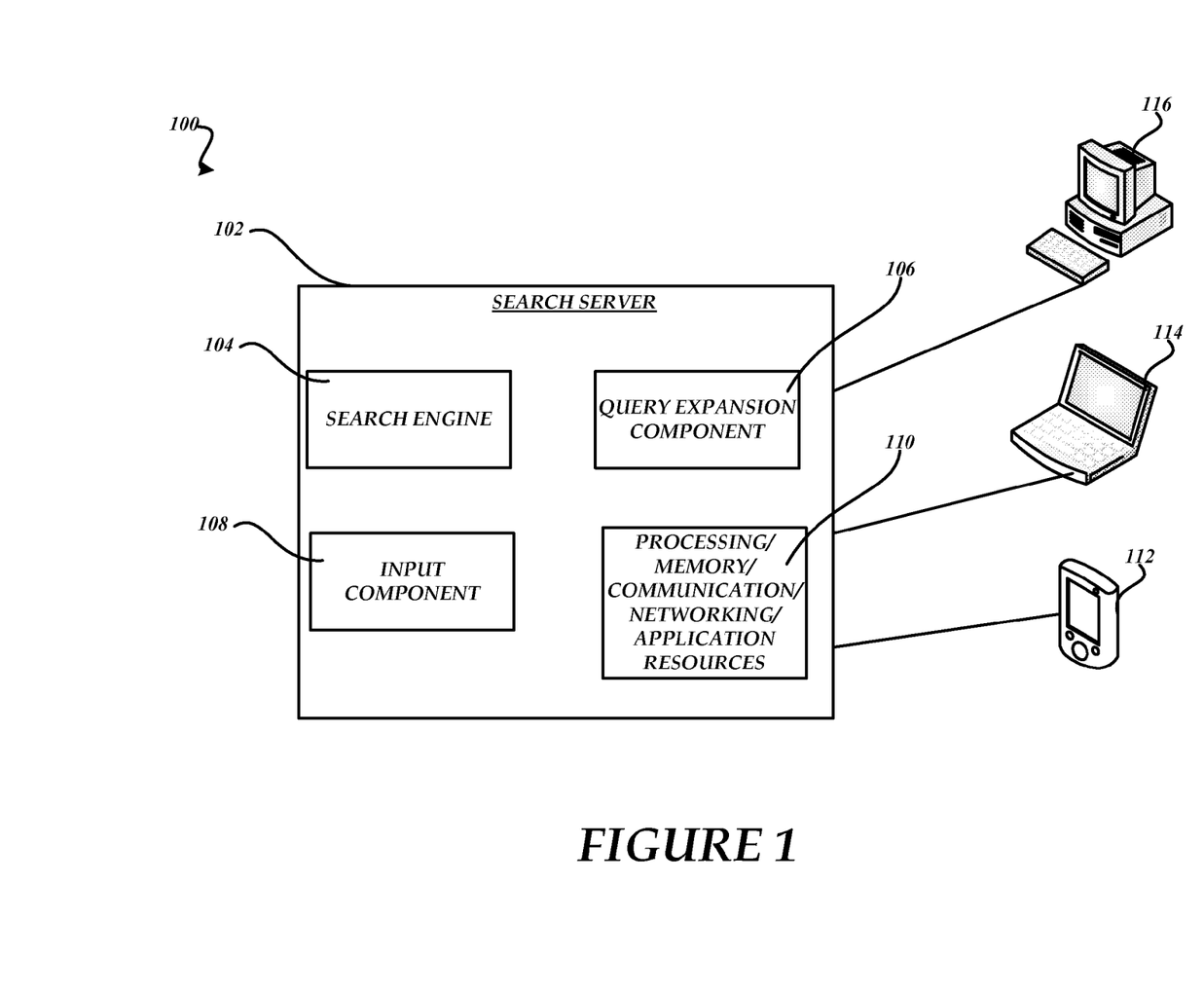
FIG. 1 is a block diagram of an exemplary search environment.

FIG. 1 is a block diagram of an exemplary search environment 100 that includes processing, memory, and other components that provide query intent determination and expansion features as part of a searching operation, but is not so limited. As shown in FIG. 1, the environment 100 includes a search server 102 including a search engine 104 configured with people-centric query determination and processing features, a query expansion or transformation component 106, an input component 108 or other parsing component(s), and/or processing/memory/communication/networking/application resources 110, but is not so limited. In addition to features described herein, the functionality of the search server 102 or other component(s) can include indexing and data structure population and/or maintenance services, web content management, enterprise content services, enterprise search, shared business processes, business intelligence services, and/or other features.

The input component 108 is configured in part to tokenize or otherwise parse an input query string into constituent parts, such as one or more original query terms or tokens for example. Correspondingly, and as described further below, the query expansion component 106 can provide expanded queries based in part on a tokenized input string. In one embodiment, the input component 108 includes a tokenizer that can be included and used locally with a client. In another embodiment, the tokenizer or other parsing component can be included with server 102 or shared therebetween. It will be appreciated that different methods of tokenization, regular expression, and other parsing and/or string recognition features can be used based in part on an input language used.

As an example, the input component 108 can be used to tokenize portions of a received query using a word breaker component according to the input query language. For example, a word breaker algorithm can be implemented that operates to parse query inputs based in part on occurrences of white space, punctuation, and/or other parsing keys. Different word breakers can be used according to the input language and/or preferred result language. A pattern matching algorithm such as a regular expression that does not rely on the input string being broken into segments can also be used. Or, the word breaking can be part of the regular expression when the regular expression includes punctuation and/or whitespace or other delimiting characters. It should be noted that other textual matching technology include literal string matching, natural language parsing, and other information processing techniques can be utilized in accordance with a particular implementation.

As shown for the exemplary environment 100 of FIG. 1, a number of exemplary components are communicatively coupled to the search server 102, including a smartphone client 112, a laptop client 114, and/or a desktop client 116. Each client can use a search interface (local or web-based) to submit queries to and receive personal name identification and other search results from the search server 102. For example, a user can use a search interface to input characters, words, etc., such as personal names or pseudonyms for example, which can be parsed and used in part to recognize a user intent to search for individuals based on a people-centric query determination algorithm, described further below.

As an example, a user interface, such as a handheld browser or search window can be used to receive typed, inked, stylus, verbal, and/or other affirmative user inputs and the query expansion component 106 can operate to provide personal name query expanders or expanding terms that include one or more personal names that included corrected inputs. As one example, the environment 100 can include searching and indexing features used in conjunction with at least one corpus of information including name directory and other information. A corpus of information can be representative of local, Intranet, Internet, and/or other networked information repositories. The corpus of information can be indexed and searched over when mining for name candidates. In one embodiment, a list of names can be imported from a directory service as part of mining name candidates. While a limited number of clients are shown, it will be appreciated that the search server 102 can serve any number of clients.

Components of the environment 100 can be used as part of searching one or more indexed data structures for relevant information associated with a user query. It will be appreciated that the search server 102 can use one or more search indexes, such as inverted and/or other index data structures for example, to provide and/or use an expanded query. For example, an inverted index can be built for each name directory, wherein each associated name can be broken into constituent tokens to form a set of distinct name tokens, using the name tokens and original names.

As described briefly above, the query expansion component 106 can operate to provide expanded queries that provide further focus to an original query input based in part on recognition of search intent corresponding to a personal or other name search. The query expansion component 106 can operate to provide a set of candidates to allow the search engine 104 to retrieve multiple possible names the user might be looking for, or a single most likely candidate, which may be viewed as a spelling correction, rather than expansion. The spelling correction can be used for high confidence misspellings and improve quality of the results by reducing the recall of likely irrelevant results and thereby focusing the user input on a particular candidate. The query expansion component 106 can provide one or more expanded query terms or strings that can be used by the search engine 104 to provide search results to a querying user. The query expansion component 106 can use one or more original input terms or tokens as part of a query expansion, alteration, or transformation operation.

With continuing reference to FIG. 1, as described above, components of the environment 100 can be used in part to discover the intent of a search query and use this information to enrich the end-user search experience. For example, components of the environment 100 can be used as part of identifying people-centric search queries and providing expanded name queries such as by narrowing a query to a single best candidate based on some confidence threshold for example. Components of the environment 100 can operate to distinguish a query between a personal name and a query unrelated to a personal name as part of discovering if a searcher's intent is person-centric or people-centric. For example, an assumption can be used that if a given query contains a person's name then the user is trying to discover information about a person, and hence the search intent is determined to be people-centric.

Any given search query can be analyzed for validating as a people-centric query, including discovering name queries as a search intention from misspelled and other erroneous inputs. Components can operate to not only detect the people name query intent, but also correct an original query to a most likely name. A rewritten or expanded query can be used to precisely return the people data for a corrected name, providing for better user search experience. For example, an original query input can be determined to be a name misspelling input and rewritten and then executed as part of a search interface limited to providing a limited number of people records (e.g., 1 or 2). The resulting people records can also be interleaved and/or otherwise presented with general web results when a name is detected from the original query with high probability. For example, an input query can be identified as a misspelled name query, corrected to a correct name query, and used as part of an query correction and/or rewriting operation.

In an embodiment, subsequent to any query pre-processing operations, the search server 102 can operate to first mine a set of similar candidates or nearest neighbor names to a given query, and then determine if any similar candidates satisfy a set of pre-defined and/or configurable constraint thresholds. If a mined candidate satisfies all the thresholds of a level, then the search server 102 can identify a given query as a name query. If the search server 102 discovers the intent of a query as people-centric then, in addition to returning information associated with a person of interest, such as a person's record for example, certain customizable actions can be triggered. For example, the customizable actions can be used to render search results in different ways, return authored documents, fetch profile information from corporate and/or public social networks, etc. Correspondingly, in addition to returning correct person information from misspelled and omitted queries, the search server 102 can also attempt to determine a user's subsequent queries (intent) apriori and thereby enrich an overall search experience, promoting a rich and user-friendly search environment.

The exemplary environment 100 of one embodiment includes a networked and/or local name directory component or components having a collection of unique names of employees or other individuals associated with an enterprise or other organization or network(s). When a user enters a query, the search engine 104 can operate to mine names from the name directory component that are nearest neighbors or otherwise correspond with a certain similarity measure, also referred to as structural similarity measure. The search engine 104 can operate to evaluate structural similarities between mined potential candidates and an original query to determine if people-centric search intent is valid.

The search engine 104 of an embodiment operates to distinguish an original query input between a name query and a non-name query by passing original query terms or tokens through a flow of people-centric determination filter nodes. A people-centric determination filter node can be used to determine if the query meets specific requirements and, if so, allows the query to proceed to a subsequent people-centric determination filter node. An original query can be classified or identified as a people-centric or name query if the query passes through enabled people-centric determination filter nodes.

In one embodiment, the search engine 104 uses a number of people-centric determination nodes or stages that include a number of active filters and/or passive filters. Since a user can enter a misspelled name query, an active filter can be used in part to mine for potential name candidates from a name directory or other information repository to account for such inputs. The active filter can be used to mine potential candidates that are most closely related to an original query input using a similarity or some other quantifying measure. The active filter of an embodiment uses structural similarity features in part to mine nearest neighbors to the given query as candidates.

In an embodiment, as part of mining a voluminous name directory or directories, a mined candidate stage performs, for each token of an original query, an approximate nearest neighbor search of name tokens to produce a list of candidate matches, such as directory tokens that are approximate matches of or structurally similar to an original query token for example. It will be appreciated that a token can be defined as a word of a personal name comprising a continuous string of characters consistent with the types of characters employed in personal names in the language of the name. Using candidate tokens, candidate names can be extracted which contain at least one of the approximate matching tokens. If no candidates are mined, the active filter operations end and/or a message can be returned to the user of the exiting operation, including redirection to a different search interface or result.

A hashing procedure to hash personal name tokens, query tokens, and/or other tokens can be implemented according to a desired outcome. In an embodiment, a data-driven learning hash function technique provides for mapping similar names to similar binary codewords based on a set of personal names in a given language (e.g., monolingual data). In one embodiment, learning certain hash functions for mapping similar names to similar binary codewords can be based in part on use of name equivalents or other measures in multiple languages. The language of an equivalent personal name can also be in a different script from the other equivalent names. For example, in a two-language implementation, name pairs can be used as training data including anticipated names in the language and script and/or an equivalent name in a different language.

For example, given a personal name query that has been broken up into its constituent tokens $Q=s_1 s_2 \ldots s_1$, each token $s_i$ is hashed into a codeword $y_i$ using an appropriate previously learned hash function (e.g., a hash function learned from using monolingual training names, or a hash function learned for the language of the query when multilingual training names are employed). For each of the resulting query codewords $y_i$, those codewords $y_i'$ in the previously built directory index that are at a prescribed distance (e.g., Hamming distance) of r or less from $y_i$ are identified. For example, a Hamming distance of 4 can be used. The name tokens corresponding to each of the identified codewords are then retrieved from the index and ranked. In one implementation, this ranking involves the use of a token-level similarity scoring procedure.

In one embodiment, token-level similarity scoring includes the use of a logistic function applied over multiple distance measures to compute a similarity score between name tokens s from the query and s' of the name tokens corresponding to the identified codewords retrieved from an associated index. For example, this token-level similarity scoring function can be defined as:

$$K(s, s') = \frac{1}{1 + e^{-\sum_i a_i d_i(s,s')}}.$$

Where $K(s,s')$ is the token-level similarity score between s and s', $d_i$ is the $i^{th}$ stance measure and $a_i$ is a weighting factor for the $i^{th}$ distance measure.

Unlike active filters, passive filters of an embodiment determine if an original input query meets specific constraints and, if so, then the input query proceeds to a name matching determination node. Passive filters can include restrictive filters and/or adaptive filters. Restrictive filters can be configured with fixed constraints, but are not so limited. In case a query input fails to meet an associated constraint, the search process ends or can be redirected to another component or process.

A name determination node of an embodiment can include the use of an adaptive filter to process mined name candidates. For example, a name matching process can be used as part of identifying a best match, or up to a prescribed number (e.g., 10) of the top scoring matches, between a personal name query and the candidate personal names taken from a candidate pool. The query and personal names in the candidate pool may typically have multiple name parts (i.e., multiple words or tokens making up the personal name). Thus, a measure of similarity between the full personal name in the query and each of the full candidate names in the candidate pool can be computed using the individual token-level similarity scores computed for each token associated with both the query and the names in the candidate pool or set.

In an embodiment, a multi-token name similarity measure can be computed as follows. First, let $Q = s_1 s_2 \ldots s_I$ and $D = s_1' s_2' \ldots s_J'$ be two multi-token names, where, Q corresponds to a personal name query, and D corresponds to one of the candidate personal names from a candidate pool. To compute the similarity between Q and D, a weighted bipartite graph is formed with a node for each $s_i$ and a node for each $s_j'$, and with an edge weight between each node being set to a previously computed token-level similarity measure $K(s_i, s_j')$. The weight ($k_{max}$) of the maximum weighted matching is computed. This maximum weighted matching represents the greatest possible sum of the individual edge weights following a node-to-node path through the graph. A maximal matching computed using a greedy approach can be used in some implementations since many of the edges in the bipartite graph may have a low weight.

Thus, a similarity between Q and D can be computed as:

$$K(Q, D) = \frac{K_{max}}{|I - J| + 1}.$$

Where $K(Q,D)$ is the similarity score between the personal name query Q and D a candidate personal name D, I is the number of tokens in the personal name query Q and J is the number of tokens in the candidate personal name D.

An adaptive filter of one embodiment includes two sets of the same type of constraints used in part to process mined candidates and/or other query input. If a query fails to meet any constraint of either set, it is removed from further consideration as a name query. In case a query passes all the constraints in either level, it can be classified as a valid personal name and output as a query expander. In an embodiment, queries can be pre-processed before performing a name matching process. For example, a query cleaning process can include removing certain character terms like parenthesis, quotes, numbers, and other non-name portions from a query before performing constraint level determinations. Such as query cleaning process can be implemented at some other time as well, such as part of processing the original query input.

As described above, the search engine 104 can use a number of processing nodes or filters to validate an original query as part of classifying as a valid name query. In one embodiment, the search engine 104 uses a restrictive filter that detects specific character tokens not generally found in names. For example, specific character tokens (e.g., '#', '@', '!', [0-9], etc.) can be characterized as noise, and an associated query can be removed from further consideration in the name query determination and/or expansion process.

A second restrictive filter can be used as part of filtering out minimal token queries. For example, queries having less than a certain number of query tokens provided as a result of a wordbreaking or other parsing service can be filtered out of the name matching process. For example, a minimal token query can be prevented from proceeding when the number of query tokens falls below a predefined threshold (e.g., two (2)). Such minimal token queries can be classified as not being name queries and removed from further consideration in the process. The search engine 104 of an embodiment uses an active filter having two (2) mining phases to mine for potential name candidates, but is not so limited.

In the first mining phase, nearest neighbors are mined for each name term from a name directory or other store. For each query, the search engine 104 mines a list of nearest neighbors. Thus, Query: {token A}-{nearest neighbor 1, nearest neighbor 2, . . . , nearest neighbor N} through {token N}-{nearest neighbor 1, nearest neighbor 2, . . . , nearest neighbor N}.

Each nearest neighbor can be associated with a similarity score to determine how close a potential candidate is to an original query. Potential candidates can also be pruned that do not satisfy any of a number of pruning conditions including, but not limited to:

a) A potential candidate includes a minimum number of valid character tokens (e.g., at least two (2)).

b) A distance measured between the potential candidate and the original query is below a predefined threshold (e.g., four (4)). The distance measure of an embodiment can be defined as the length offset.

c) A similarity threshold associated with the potential candidate is above a defined threshold (e.g., >=90%).

After pruning the potential candidates, remaining candidates proceed to the second mining phase. If no potential candidates pass through after the pruning operations, then the flow does not proceed to the second mining phase. In the second mining phase, all candidate names (e.g., complete names (first name, last name)) are selected from a name directory or other repository that includes one or more of the potential candidate names. Since every name term can be associated with a similarity score, averages can be used to flatten the scores and calculate a geometric distance average score for each mined candidate. As part of the second mining phase, the search engine 104 operates to eliminate all such candidate names that have fewer terms than the original query.

The search engine 104 also uses an adaptive filter that uses the output of the candidate mining process to evaluate a structural similarity between mined names and an original query. The adaptive filter of an embodiment uses two name determination levels, wherein each name determination level includes a fixed set of constraint types, each set having different threshold values. Valid name results can be identified from the mined names that satisfy each constraint of one of the name determination levels. Correspondingly, if one or more mined potential candidates satisfy all of the constraints in a level, then the query is considered as a valid name query and used as part of providing an altered, expanded query, or transformed query. In an embodiment, the adaptive filter constraint set includes a geometric distance measure, an edit distance measure, a string similarity measure, and/or a cumulative similarity measure collectively used to identify one or more first and last names to be included as part of an expanded query formulation.

The geometric distance measure of an embodiment includes the use of a canonical geometric score associated with a mined name candidate and an original query. For example, the canonical geometric score can include a level 1 threshold of 99% and a level 0 threshold of 95%.

The edit distance measure of an embodiment includes the use of a Levenshtein edit distance score associated with each mined name candidate and the original query. The Levenshtein edit distance is a measure of similarity between two (2) strings (e.g., source and target strings) accounting for a number of deletions, insertions, or substitutions required to transform the source string to the target string. The higher the edit distance, the less similarity between two (2) strings. For example, a factor of four (4) can be used as part of the edit distance score using a scoring function $f(n)=1/(1+n)$ where n is the number of deletion, insertions, or substitutions required to transform source to destination. For example, the edit distance score can include a level 1 threshold of 0.4 and a level 0 threshold of 0.5.

The string similarity measure of an embodiment includes the use of a Jaro-Winkler string similarity measure or distance score associated with a mined name candidate and the original query. The higher the Jaro-Winkler distance, the more similar two strings are. For example, a factor of four (4) can be used as part of the Jaro-Winkler distance score using a scoring function $f(n)=1/(2-n)$. For example, the Jaro-Winkler distance score can include a level 1 threshold of 2.95 and a level 0 threshold of 3.0.

The cumulative similarity measure of an embodiment is based on the geometric score, the edit distance score, and the string similarity score. For example, the cumulative similarity score can include a level 1 threshold of 5.0 and a level 0 threshold of 5.75.

If any mined name candidate satisfies all constraints of either level, then each such mined name candidate can be classified as a valid name query expander (e.g., first and last name). As such, the original query can be classified as a valid name query and/or transformed to include any name query expander output as part of an expanded name query. An expanded name query, including corrected name inputs used as expander terms, can be executed by the search engine 104 to locate information associated with a searched over name or names and/or performing any other customizable actions (e.g., display a photo, display authored documents or links, pull a profile, provide a v-card, etc.).

The search engine 104 of an embodiment operates to automatically execute an expanded name query against a name directory or other information repository, returning relevant information associated with a person or persons of interest. The search engine 104 can also preemptively provide additional information associated with a person of interest, such as a profile, picture, authored documents, etc. The search engine 104 can use any number of relevancy algorithms as part of returning search results including links associated with files, documents, web pages, file content, virtual content, web-based content, etc. For example, the search engine 104 can use text, property information, and/or metadata when returning relevant search results associated with local files, remotely networked files, combinations of local and remote files, other data structures, etc.

The functionality described herein can be used by or part of an operating system (OS), file system, web-based system, or other searching system, but is not so limited. The functionality can also be provided as an added component or feature and used by a host system or other application. In one embodiment, the environment 100 can be communicatively coupled to a file system, virtual web, network, and/or other information sources as part of providing searching features. An exemplary computing system that provides query expansion and searching features includes suitable programming means for operating in accordance with a method of providing mined name information and/or search results.

Suitable programming means include any means for directing a computer system or device to execute steps of a method, including for example, systems comprised of processing units and arithmetic-logic circuits coupled to computer memory, which systems have the capability of storing in computer memory, which computer memory includes electronic circuits configured to store data and program instructions. An exemplary computer program product is useable with any suitable data processing system. While a certain number and types of components are described herein, it will be appreciated that other numbers and/or types and/or configurations can be included according to various embodiments. Accordingly, component functionality can be further divided and/or combined with other component functionalities according to desired implementations.

Figure 2:
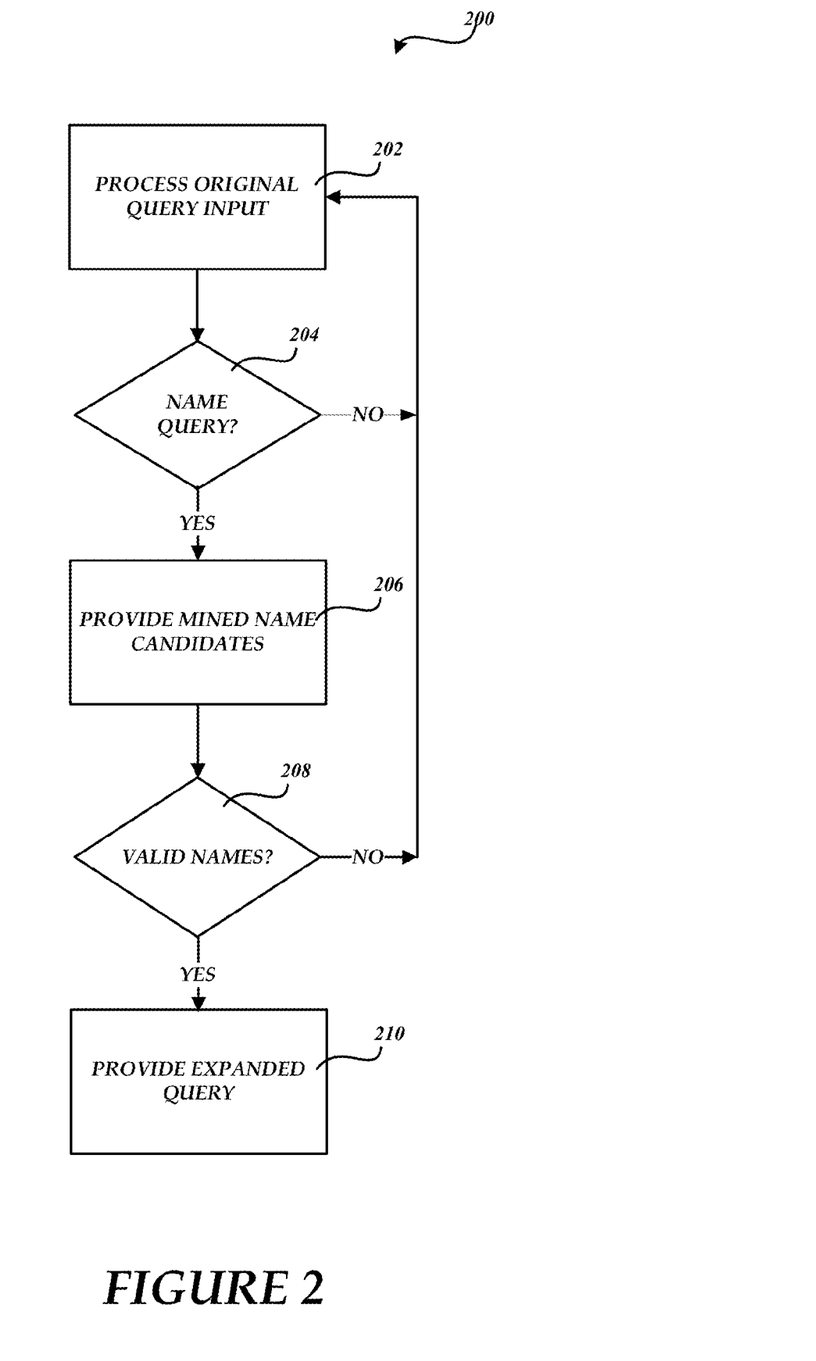
FIG. 2 is a flow diagram illustrating an exemplary process of providing expanded query features.

FIG. 2 is a flow diagram illustrating an exemplary process 200 of providing expanded query features including mining for valid name candidates and providing expanded name queries based in part on original query inputs, but is not so limited. At 202, the process 200 operates to process an original query input as part of determining people-centric query intent. For example, the process 200 at 202 can operate to pre-process the original query input including parsing operations and/or removing any invalid characters and/or identifying non-name queries. At 204, the process 200 determines if the original query input is a name query. If the original query input is not a name query then the flow returns to 202 and the process 200 waits for a new input.

If the process 200 at 204 determines that the original query input is a name query, then the process 200 at 206 of an embodiment operates to provide any mined name candidates using a similarity determination. For example, the process 200 can use a networked search server to quantify similarity determinations made as part of identifying nearest neighbor first and last name candidates to an original first and last name query input. If no mined candidates are provided at 206, the process 200 returns to 202 and waits for a new input.

At 208, the process 200 uses a name matching determination to identify any valid names from the mined name candidates. For example, the process 200 at 208 can operate to identify valid first and last names based in part on a number of constraints and associated threshold levels to validate mined name candidates. At 210, the process 200 operates to provide an expanded query including the original query input and one or more validated first and last names.

It will be appreciated that processing and/or networking features can assist in providing real-time name searching and mining features. The process 200 of an embodiment can also operate to automatically execute an expanded query without any user input other than the original query. Aspects of the process 200 can be distributed to and among other components of a computing architecture, and client, server, and other examples and embodiments are not intended to limit features described herein. While a certain number and order of operations is described for the exemplary flow of FIG. 2, it will be appreciated that other numbers and/or orders can be used according to desired implementations.

Figure 3:
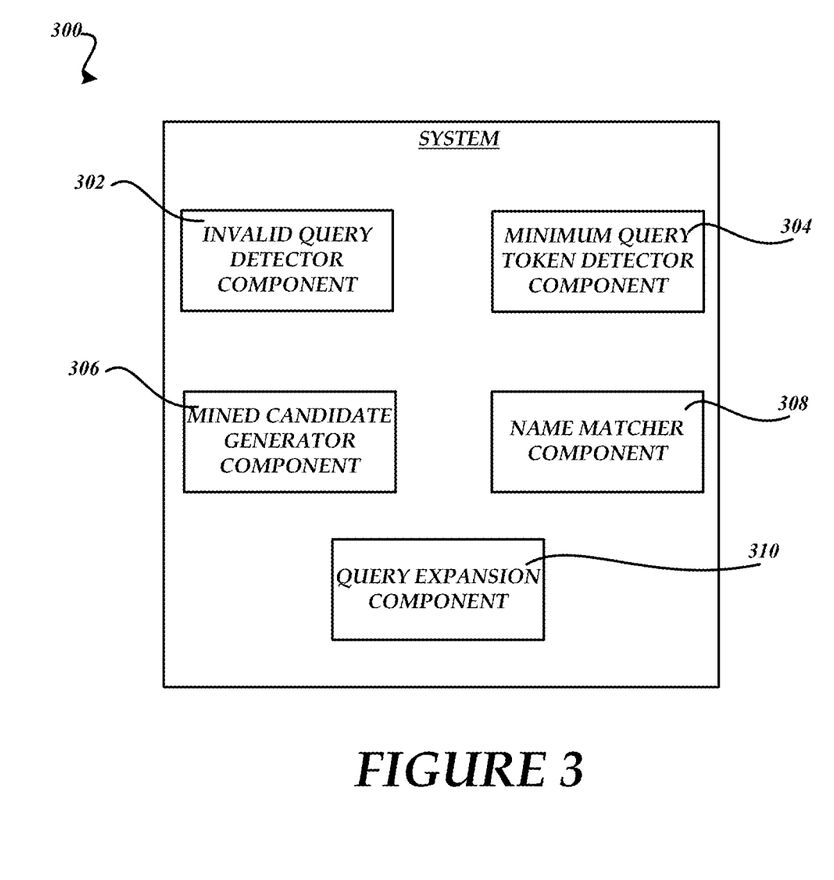
FIG. 3 is a block diagram of an exemplary people-centric search system.

FIG. 3 is a functional block diagram of an exemplary people-centric search system 300 that includes functionality to provide personal name mining, matching, and other searching features as part of a name matching process. While a client is not shown, it will be appreciated that many types of computing devices/systems and searching interfaces can use features of the people-centric search system 300. For example, a user can submit a search query including one or more query terms using a smartphone interface, laptop computer interface, tablet interface, desktop interface, or other computer/communication interface as part of mining for name candidates associated with a people-centric input query.

As shown, the exemplary people-centric search system 300 includes, an invalid query detector component 302, a minimum query tokens detector component 304, a mined candidate generator component 306, a name matcher component 308, and a query expansion component 310, but is not so limited. The query expansion component 310 operates in part to use an original query input and a number of valid name candidates to generate an expanded query to use as part of a searching operation.

The invalid query detector component 302 is configured to filter invalid queries based in part on assessing a number of original query tokens. For example, if a query string contains non-name terms, the invalid query detector component 302 operates to output the original query string for use in a general search interface or system and prevents the original query from proceeding further in the name matching process. The minimum query tokens detector component 304 is configured to filter queries having a number of query tokens that is less than a defined query token threshold. For example, if a query string contains minimal token numbers, the minimum query tokens detector component 304 operates to output the original query string for use in a general search interface or system and prevents the original query from proceeding further in the name matching process.

The mined candidate generator component 306 operates in part to mine name candidates from a name directory and/or other repository that have a certain degree or measure of similarity to the original query. The mined candidate generator component 306 can output one or more mined name candidates as an input to the name matcher component 308. If no mined name candidates pass through the mined candidate generator component 306, the original query string can be output for use in the general search interface or system and prevented from proceeding on to the name matcher component 308.

If mined name candidates pass through the mined candidate generator component 306, the original query string along with any mined name candidates are output to the name matcher component 308. The name matcher component 308 operates to perform a similarity assessment between the original query and any mined name candidates output from the mined candidate generator component 306. The name matcher component 308 is configured to output one or more valid personal names, including name corrections, as an input to the query expansion component 310. However, if no valid personal names are output from the name matcher component 308, the original query string is output for use in the general search interface or system, and the people-centric search system 300 waits for further input. While a number of components and features are described, other embodiments are included and configurable.

Figure 4:
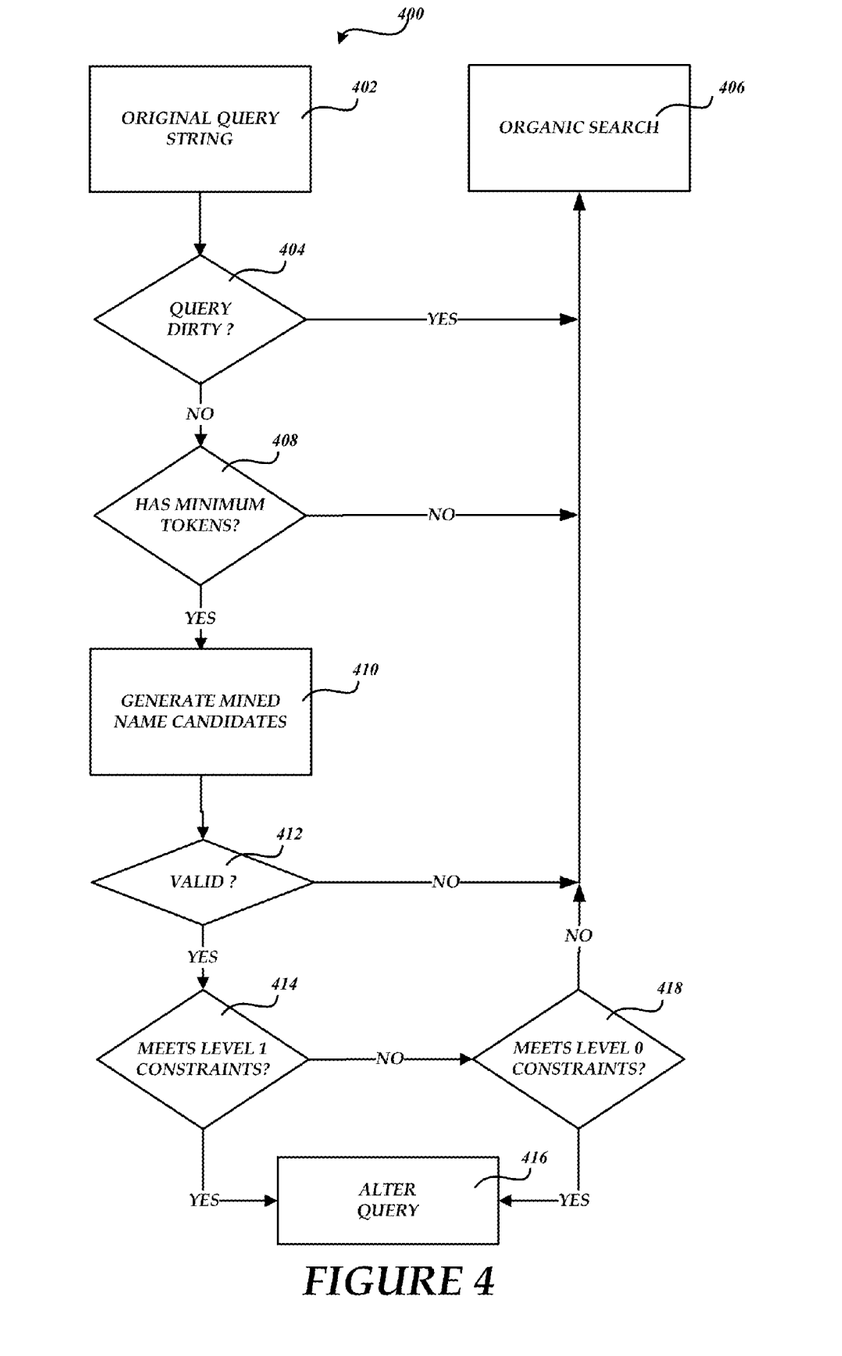
FIG. 4 is a flow diagram illustrating an exemplary process of providing mined candidate and name matching features.

FIG. 4 is a flow diagram illustrating an exemplary process 400 of providing name mining and matching features, but is not so limited. For example, the process 400 can be used to mine name candidates from an information repository and use a name matching algorithm to output one or more valid names. At 402, the process 400 receives an original query string. For example, an end-user can use a search interface of a client application to submit an original search query as part of performing a search that the process 400 can recognize as focusing on a person of interest.

At 404, the process 400 operates to identify dirty or non-name queries based in part on the original query string. If the process 400 identifies the original query string as dirty, the flow proceeds to 406 wherein an organic search interface or process can be used to process the original query string. For example, the process 400 can operate at 404 to locate tokens that are deemed non-name tokens. If the original query string is not identified as dirty at 404, then the process 400 at 408 determines if the original query string has a defined minimum number of query tokens. If the process 400 identifies that the number of original query string tokens are insufficient at 408, then flow proceeds to 406, wherein the organic search interface or process can be used to process the original query string.

If the process 400 identifies that the number of original query string tokens is sufficient at 408, then flow proceeds to 410 and the process 400 operates to generate mined name candidates. For example, the process 400 can use a similarity determination between the original input tokens to identify nearest neighbor name candidates based in part on a similarity measure associated with names of a directory component. If the process 400 does not identify any mined name candidates at 410, the flow proceeds to 406 wherein an organic search interface or process can be used to process the original query string.

If the process 400 identified any mined name candidates at 412, the flow proceeds to 414. If each mined name candidate satisfies all of the level 1 constraints at 414, the flow proceeds to 416 and the process 400 operates to alter the original query to include the original query string and one or more valid names corresponding to one or more mined name candidates that satisfied all level 1 constraints. If each mined name candidate does not satisfy at least one level 1 constraint at 414, the flow proceeds to 418. If each mined name candidate satisfies all of the level 0 constraints at 418, the flow proceeds to 416 and the process 400 operates to alter the original query to include the original query string and one or more valid names corresponding to one or more mined name candidates that satisfied all level 0 constraints. In one embodiment, the process 400 uses the same set of constraint types for level 0 and level 1, albeit with different threshold values. For example, a constraint set can include a geometric similarity or distance measure, an edit distance measure, a string similarity measure, and a cumulative measure to process mined name candidates, wherein different constraint level values can be implemented to stress an amount of importance associated with each measure.

With continuing reference to FIG. 4, if each mined name candidate does not satisfy at least one level 0 constraint at 418, then the flow proceeds to 406 wherein the organic search interface or process can be used to process the original query string. An altered query including one or more valid name expanders can be automatically executed as part of a search engine operation to provide relevant search results. In one embodiment, the process 400 can operate to correct an original query input and use the corrected name as an altered, new, or rewritten query. Additionally, the process 400 can include functionality to perform one or more customizable actions, such as linking social networking information and/or providing a short biography with returned name results as examples. The process 400 can be used as part of a people-centric search and is not intended to be limited to any particular type of search corpus.

It will be appreciated that processing and/or networking features can assist in providing real-time searching and expertise mining features. Aspects of the process 400 can be distributed to and among other components of a computing architecture, and other examples and embodiments are not intended to limit features described herein. While a certain number and order of operations is described for the exemplary flow of FIG. 4, it will be appreciated that other numbers and/or orders can be used according to desired implementations.

An illustrative example of name mining and matching features is described below. Assume for this example that a search service uses a name mining and matching algorithm in part to determine people-centric query intent, correct misspelled name inputs, and/or provide expanded name queries using an original query input.

Consider the following queries:
Query A: "Windows Phone 7"
Query B: "Sarah Sinofsky Blog Article"
Query C: "Dillilah Mayorson"
Query D: "Town Hall"
Query E: "workflow"

Assume that the queries are based on inputs to a search interface of a smartphone or other handheld device, laptop, desktop, tablet, etc.

As described below, a number of processing nodes are used to process a query as part of classification as a name query. An invalid query detector node can be configured as a restrictive filter to identify specific character tokens of an original query input that are dirty. If such a token is identified, the original query input does not proceed to the next node. Exemplary dirty character tokens include tokens that are not generally found in names, such as '#', '@', '!', [0-9], etc.

Result of invalid query detector node:
Query A will be deemed dirty and will not continue to subsequent nodes. However, queries B-E pass through the invalid query detector node.

A minimum query tokens detector node can be configured as a restrictive filter to verify a sufficient number of tokens included as part of the original query input. For example, a parsing service can parse an original query input into term tokens. For this example, as part of mining personal name candidates, if the number of original tokens falls below a predefined threshold (e.g., two (2)), then the original query input is not considered as a name query and does not to proceed to the next processing node.

Result of minimum query tokens detector node:
Query B: Word broken into {Sarah, Sinofsky, Blog, Article}-size 4
Query C: Word broken into {Dillilah, Mayorson}-size 2
Query D: Word broken into {Town, Hall}-size 2
Query E: Word broken into {workflow}-size 1-Does not meet minimum threshold and is marked invalid.

A mined candidate generator node can be configured as an active filter having two phases. In the first phase, nearest neighbors are mined for each name term using a name directory. That is, for each query term, mine a list of nearest neighbors.

For Query C of this example:

| Original Token | Nearest neighbors |
| --- | --- |
| Query C: {Dillilah} | {Dililah, Dilila, Dellilah} |
| {Mayorson} | {Meyerzon, Michelson, Myerson, Myer} |

Each nearest neighbor is based in part on a similarity score which determines how close a candidate is to the original query input.

Similarity scores, shown as percentages, for Query C are:
{Dillilah}-{Dililah (93%), Dilila (95%), Dellilah(99%)}
{Mayorson}-{Meyerzon (97%), Mayerzon(98%), Michelson (89%), Myerson (98%), Myer (90%)}

A pruning node can be used to prune candidates that do not satisfy any of the following three conditions:
1) Includes a minimum number of valid character tokens (e.g., at least 2).
2) The distance between the name and the original query is equal to or below a predefined threshold (e.g., four (4)). The distance here is the length offset.
(Thus: Mined candidate "Myer" is eliminated as the distance between "Mayorson" and "Myer" is 4).
And, 3) Similarity score is above a pre-defined threshold (e.g., >=90%)
Thus: Mined candidate "Michelson" is eliminated as the similarity threshold is <90%.

After pruning the list of mined candidates, any remaining candidates proceed to the next node. If no candidates remain after pruning, the processing ceases.

For this example, the following mined candidates proceed:
{Dillilah}-{Dililah (93%), Dilila (95%), Dellilah(99%)}
{Mayorson}-{Meyerzon (97%), Myerson (98%)}

In the second phase, name mining and matching features are used to select all names (complete names (e.g., first, last)) from a name directory that have one or more of the mined candidate terms.

For this example, mined names from the name directory include:
{Dililah Meyerzon, Dilila Mayerzon, Chadd Myerson, Dellilah Petruic}

As part of the second phase, the similarity scores for each mined name are averaged, such that:
Mined Name 1: Dililah Meyerzon (93+97)/2=95%
Mined Name 2: Dilila Mayerzon (95+98)/2=96.5%
Mined Name 3: Chadd Myerson (0+98)/2=49%
Mined Name 4: Dellilah Petruic (99+0)/2=49.5%

The second phase also operates to eliminate all such mined names that include fewer terms than in the corresponding original query input. For example, if "Sarah Sinofsky" was a mined name for Query B ("Sarah Sinofsky Blog Article"), since the number of terms in the mined name is less than the original query (i.e., 2<4), the mined name "Sarah Sinofsky" would be removed from further consideration. If no potential name candidates are mined, then the name matching process stops or exits to another process.

The name matching process of an embodiment includes the use of a name matcher node configured as a passive adaptive filter to process all valid mined name candidates based in part on a structural similarity measure associated with the mined name candidates and the original query input. The name matcher node of an embodiment includes two (2) levels or phases comprising the same set of constraints but using different threshold values to quantify different name matching features. If one or more of the mined candidates satisfy all the constraints in a level, then the original query input is considered as a valid name query.

Exemplary level constraints include, but are not limited to:

1) A canonical geometric score or mined confidence factor between each mined name candidate and the original query input. For example, a level 1 threshold of 99% and a level 0 threshold of 95% can be used as determination thresholds for the geometric distance constraint.

2) A Levenshtein edit distance score between each mined name candidate and the original query input that defines a measure of similarity between strings. For example, the edit distance between the source and target strings is the number of deletions, insertions, and/or substitutions required to transform the source string to the target string. The greater the edit distance, the less similarity between the strings. For this example, a factor of 4 is used for the edit distance score using a r scoring function of $f(n)=1/(1+n)$ where n is the number of deletion, insertions, and/or substitutions required to transform source to destination. For example, a level 1 threshold of 0.4 and a level 0 threshold of 0.5 can be used as determination thresholds for the edit distance constraint.

3) A Jaro-Winkler distance score between each mined name candidate and the original query input. The greater the Jaro-Winkler distance score, the more similar the strings. For this example, a factor of 4 is used for the Jaro-Winkler distance score using a scoring function is $f(n)=1/(2-n)$. For example, a level 1 threshold of 2.95 and a level 0 threshold of 3.0 can be used as determination thresholds for the Jaro-Winkler constraint.

4) A cumulative similarity score between each mined name candidate and the original query comprising a function defined in part by the geometric score, Levenshtein edit distance score, and the Jaro-Winkler distance score.

For example, the cumulative similarity score can be calculated as [(((GeometricSimilarityFactor*minedCandidate.Confidence*minedCandidateLength))+editSimilarity)+jaroWinkerSimilarity]. For example, a level 1 threshold of 5.75 and a level 0 threshold of 5.0 can be used as determination thresholds for the cumulative similarity constraint and a geometric similarity factor or measure of 1.0.

As described above, according to an embodiment, to pass-through as a valid name and used as part of an expanded or transformed query, a mined name candidate has to satisfy all four constraints using either level 1 or level 0 thresholds.

For the current example:
Original query input: Dillilah Mayorson
Mined Name 1: Dililah Meyerzon (Geom Score=95%, mined candidate length=2, Lev. Score=0.5, JW Score=3.13)
Mined Name 2: Dilila Mayerzon (Geom Score=96.5%, Lev. Score=0.52, JW Score=3.26)
Mined Name 3: Chadd Myerson (Geom Score 49%)
Mined Name 4: Dellilah Petruic (Geom Score 49.5%)

Using compiled data for the first and last name candidates, the name matching algorithm determines that:

1) None of the mined name candidates meet the Level 1 geometric distance threshold of 99%, so the Level 0 thresholds are then considered for the full first and last name candidates. Only Dililah Meyerzon and Dilila Mayerzon satisfy the Level 0 geometric distance threshold of 95%.

2) Dililah Meyerzon has a geometric distance of 0.95, Levenshtein edit distance score of 0.5, Jaro-Winkler distance score of 3.13, and cumulative similarity score of 5.53[(0.95*2)+0.5+3.13], and therefore satisfies all of the level 0 thresholds and is identified as a valid name query. Dilila Mayerzon is also a considered as valid name query by satisfying all of the level 0 constraints. Accordingly, Query C is identified as a name query associated with a people-centric search intent. Using the valid name queries, the original query input (Query C) can be altered or transformed to (Dililah AND Meyerzon) OR (Dilila AND Mayerzon) and used by the search service to provide relevant search results associated with the person-centric query intent. It is noted that the transformed query includes the valid combined first and last names for each mined candidate that satisfied the name matching determination.

An exemplary name matcher can be encoded as:

```
Procedure: Name Matcher
Begin Procedure:
For (level: 1 to 0 )
Begin For:
        For(minedCandidates: 1 to MinedCandidateCollection.Size)
        Begin For:
geometricDistance =DistanceThreshold [level] [Geometric]
            editDistance = DistanceThreshold [level] [Edit]
            jaroWinklerDistance = DistanceThreshold [level]
[JaroWinkler]
cumulativeDistance = DistanceThreshold [level] [Cumulative]
            If (minedCandidate.GeometricScore < geometricDistance)
//Candidates are sorted by geometric score. No subsequent candidate
satisfies the minimum //threshold condition. This is not a name query.
                BREAK
            If (minedCandidate.EditDistanceScore < editDistance)
//This candidate does not meet the edit distance threshold, move to the
next candidate
                CONTINUE
            If (minedCandidate.JaroWinklerDistanceScore <
jaroWinklerDistance)
//This candidate does not meet the jaro distance threshold, move to the
next candidate
                CONTINUE
            If (minedCandidate.CumulativeDistanceScore <
cumulativeDistance)
//This candidate does not meet the cumulative distance threshold, move to
the next candidate
                CONTINUE
                //Satisfies all the constraints, this is a valid name query.
Add it to the bucket
            ValidNameBucket.Add(minedCandidate)
        End For
        If (ValidNameBucket.NotEmpty)
//No need to move to the next level if there are already high confidence
results in the top level
            BREAK
    End For
If (ValidNameBucketNotEmpty)
    //Sort the results and return the top result
    ValidNameBucket.Sort
    Return NameQuery = TRUE
Else
    Return NameQuery = FALSE
```

While certain embodiments are described herein, other embodiments are available, and the described embodiments should not be used to limit the claims. Exemplary communication environments for the various embodiments can include the use of secure networks, unsecure networks, hybrid networks, and/or some other network or combination of networks. By way of example, and not limitation, the environment can include wired media such as a wired network or direct-wired connection, and/or wireless media such as acoustic, radio frequency (RF), infrared, and/or other wired and/or wireless media and components. In addition to computing systems, devices, etc., various embodiments can be implemented as a computer process (e.g., a method), an article of manufacture, such as a computer program product or computer readable media, computer readable storage medium, and/or as part of various communication architectures.

The term computer readable media as used herein may include computer storage media. Computer storage media may include volatile and nonvolatile, removable and non-removable media implemented in any method or technology for storage of information, such as computer readable instructions, data structures, program modules, or other data. System memory, removable storage, and non-removable storage are all computer storage media examples (i.e., memory storage.). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computing device. Any such computer storage media may be part of device.

The embodiments and examples described herein are not intended to be limiting and other embodiments are available. Moreover, the components described above can be implemented as part of networked, distributed, and/or other computer-implemented environment. The components can communicate via a wired, wireless, and/or a combination of communication networks. Network components and/or couplings between components of can include any of a type, number, and/or combination of networks and the corresponding network components include, but are not limited to, wide area networks (WANs), local area networks (LANs), metropolitan area networks (MANs), proprietary networks, back-end networks, etc.

Client computing devices/systems and servers can be any type and/or combination of processor-based devices or systems. Additionally, server functionality can include many components and include other servers. Components of the computing environments described in the singular tense may include multiple instances of such components. While certain embodiments include software implementations, they are not so limited and encompass hardware, or mixed hardware/software solutions. Other embodiments and configurations are available.

Exemplary Operating Environment

Figure 5:
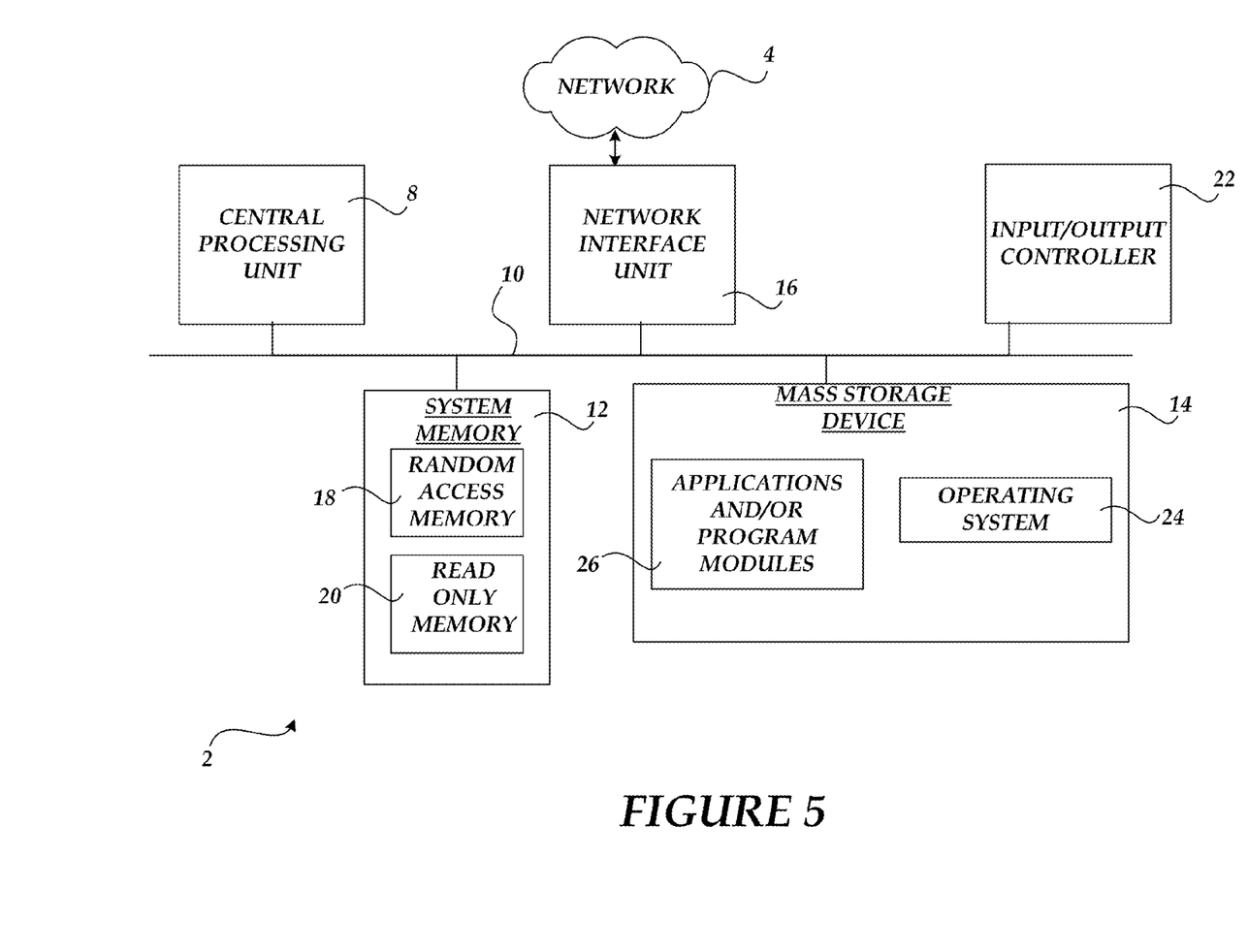
FIG. 5 is a block diagram illustrating an exemplary computing environment for implementation of various embodiments described herein.

Referring now to FIG. 5, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 5, an illustrative operating environment for embodiments of the invention will be described. As shown in FIG. 5, computer 2 comprises a general purpose server, desktop, laptop, handheld, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 24, application programs, and other program modules.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 24 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as word processing, spreadsheet, drawing, e-mail, and other applications and/or program modules, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method comprising:
   using a server computer as part of:
   generating a number of mined candidates based in part on using a learned hash function and valid pass-through of an original query input that includes determining if the original query input satisfies a first restrictive filter stage comprising an invalid query detector filter and a second restrictive filter stage comprising a minimum query tokens detector filter;
   using an active mining filter having a number of phases to further process mined candidates;
   using an adaptive filter comprising a multi-level name matcher constraint set that includes first threshold levels and second threshold levels; and
   generating an expanded query that includes the original query input and any valid name corresponding to any mined candidate that satisfies all of the first threshold levels or all of the second threshold levels associated with the multi-level name matcher constraint set.

2. The method of claim 1, further comprising generating the expanded query using the multi-level name matcher constraint set including a geometric measure, an edit distance measure, a string similarity measure, and a cumulative similarity measure.

3. The method of claim 2, further comprising generating the expanded query using the multi-level name matcher constraint set, wherein the geometric measure comprises a canonical geometric score, the edit distance measure comprises a Levenshtein edit distance score, the string similarity measure comprises a Jaro-Winkler distance score, and the cumulative similarity measure comprises a cumulative distance score based in part on the canonical geometric score, the Levenshtein edit distance score, and the Jaro-Winkler distance score.

4. The method of claim 1, further comprising automatically executing the expanded query as part of discovering a searching intent to be people-centric including using customized actions to enrich a search experience.

5. The method of claim 4, further comprising automatically executing the expanded query containing a candidate expansion having a highest confidence measure according to a specified threshold to provide one or more person records including using the customized actions to perform one or more of rendering search results in a different way, returning a number of authored documents or other items, and fetching profile information from social and other networks.

6. The method of claim 1, further comprising using a first threshold value and a second threshold value as part of first and second geometric measure assessments, using a first threshold value and a second threshold value as part of first and second edit distance measure assessments, using a first threshold value and a second threshold value as part of first and second string similarity measure assessments, and using a first threshold value and a second threshold value as part of first and second cumulative similarity measure assessments, including returning one or more valid personal names to be used as part of the expanded query if one or more mined candidates satisfy all of the first threshold level values or all of the second threshold level values.

7. The method of claim 6, further comprising using the second threshold values once one of the first threshold level values is not satisfied.

8. The method of claim 5, further comprising assigning different threshold level values based in part on importance of one or more of geometric similarity constraints and structural similarity constraints.

9. The method of claim 1, further comprising using the similarity score and one or more mined name candidates that are nearest neighbors to original query tokens, wherein a similarity score is calculated for each nearest neighbor in part to determine relatedness between each mined first and last name candidate and the original query tokens.

10. The method of claim 9, further comprising mining a list of nearest neighbors for each query term of the original query input and determining if each mined nearest neighbor satisfies a similarity threshold value.

11. The method of claim 1, further comprising exiting to an organic search service if the number of mined candidates is zero or if no mined candidate satisfies all threshold levels of one of the first or second constrain sets of the adaptive filter.

12. A search system including at least one processor, the system comprising:
   an invalid query detector component configured to filter invalid queries based in part on a number of original query tokens;
   a minimum query tokens detector component configured to filter out query inputs having a defined number of query tokens that are less than a defined query token threshold;
   a mined candidate generator component configured to generate mined name candidates based in part on the number of original query tokens and a similarity measure;
   a name matcher component configured to generate a number of valid names based in part on an output from the mined candidate generator and a plurality of threshold values associated with a first threshold determination stage and a second threshold determination stage, wherein the name matcher component is configured to generate the number of valid names based in part on an output from the mined candidate generator and a geometric measure, an edit distance measure, a string similarity measure, and a cumulative similarity measure; and a query expander component configured to provide expanded queries based in part on one or more original query terms and one or more valid names.

13. The search system of claim 12, the mined candidate generator to generate mined name candidates from a name repository based in part on a number of original query terms and a similarity measure threshold value including a selection of all first and last names from a name directory component that include one or more mined terms.

14. The search system of claim 13, the mined candidate generator to eliminate mined personal names that have fewer terms than the number of original query terms.

15. The search system of claim 12, the name matcher component to generate the number of valid names based in part on an output from the mined candidate generator and a canonical geometric score, a Levenshtein edit distance score, a Jaro-Winkler distance score, and a cumulative similarity score.

16. Computer storage, including instructions which, when executed, operate to:

use an original query to mine personal names including using an invalid query detector filter, a minimum query tokens detector filter, and an active mining filter having a number of phases;

generate altered query terms comprising personal names using an adaptive filter including a geometric measure, an edit distance measure, a string similarity measure, and a cumulative similarity measure; and provide an altered query using one or more valid personal names having satisfied at least one level of the adaptive filter.

17. The computer storage of claim 16, including instructions which, when executed, operate to automatically execute the altered query against a name directory.

18. The computer storage of claim 16, including instructions which, when executed, operate to use the altered query to provide information associated with one or more individuals including authored materials or contact information associated with a social network.

* * * * *